United States Patent
Kawashima et al.

(10) Patent No.: US 8,440,040 B2
(45) Date of Patent: May 14, 2013

(54) TAPE ADHERING METHOD AND TAPE ADHERING DEVICE

(75) Inventors: Isamu Kawashima, Mitaka (JP); Hideshi Sato, Mitaka (JP); Hideo Kino, Mitaka (JP); Minoru Ametani, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 189 days.

(21) Appl. No.: 12/898,568

(22) Filed: Oct. 5, 2010

(65) Prior Publication Data

US 2011/0024020 A1 Feb. 3, 2011

Related U.S. Application Data

(62) Division of application No. 11/744,199, filed on May 3, 2007, now abandoned.

(30) Foreign Application Priority Data

May 22, 2006 (JP) ................................. 2006-141672

(51) Int. Cl.
*B44C 1/165* (2006.01)
*B29C 65/50* (2006.01)
(52) U.S. Cl.
USPC ........................................... 156/230; 156/60
(58) Field of Classification Search ............... 156/60, 156/230; *B29C 65/50*
See application file for complete search history.

(56) References Cited

U.S. PATENT DOCUMENTS

| 4,984,750 | A | * | 1/1991 | Shigeta et al. ................ 242/553 |
| 6,238,515 | B1 | * | 5/2001 | Tsujimoto et al. .......... 156/379.8 |
| 6,258,198 | B1 | | 7/2001 | Saito et al. |
| 2007/0074822 | A1 | | 4/2007 | Akechi |

FOREIGN PATENT DOCUMENTS

| EP | 1 617 462 A2 | 1/2006 |
| EP | 1 672 684 A1 | 6/2006 |
| JP | 2006-44152 | 2/2006 |
| JP | 2006-073920 | 3/2006 |
| WO | WO 2005/037698 A1 | 4/2005 |
| WO | WO 2006/100932 A1 | 9/2006 |

OTHER PUBLICATIONS

Patent Abstracts of Japan, Publication No. 2006-044152, Published on Feb. 16, 2006, in the name of Hirai, et al.
European Search Report dated May 2, 2008, for corresponding European application 07108403.2, indicating relevance of references listed in this IDS (except U.S. Publication 2007/0074822).

(Continued)

*Primary Examiner* — Philip Tucker
*Assistant Examiner* — Shawn F Hogan
(74) *Attorney, Agent, or Firm* — Christie, Parker & Hale, LLP (57) ABSTRACT

A tape adhering device including: a drawing roller for drawing out a tape; a tape fixing means for fixing one portion of the tape drawn out from the drawing roller; a tape drawing means for drawing out a predetermined amount of tape, which is fixed by the tape fixing means, from the drawing roller between the tape fixing means and the drawing roller; and a tape adhering means for adhering the tape, which is located in the downstream of the tape fixing means, onto an object to be adhered under the condition that fixing operation of the tape by the tape fixing means is released.

3 Claims, 6 Drawing Sheets

OTHER PUBLICATIONS

Singapore Search report dated Jan. 25, 2008, for corresponding Singapore application 200703398-8, indicating relevance of references listed in this IDS.

Japanese Office action mailed Aug. 2, 2011 for corresponding Japanese Application No. 2006141672, including English translation, 5pp.

* cited by examiner

TAPE ADHERING METHOD AND TAPE ADHERING DEVICE

CROSS REFERENCE TO RELATED APPLICATIONS

This application is a divisional of U.S. application Ser. No. 11/744,199, filed on May 3, 2007, now abandoned which claims priority to Japanese application 2006-141672, filed on May 22, 2006.

BACKGROUND OF THE INVENTION

1. Field of the Invention

The present invention relates to a tape adhering method for adhering a tape, for example, a dicing tape onto a back surface of a wafer. The present invention also relates to a tape adhering device of executing this tape adhering method.

2. Description of the Related Art

In the field of manufacturing semiconductors, there is a tendency for large-sized wafers to be used year after year. Further, in order to enhance the packing density, the wafer thickness is reduced, and in order to reduce the wafer thickness, the back surface of a semiconductor wafer is ground. At the time of back-grinding, in order to protect a semiconductor element formed on a front surface of the wafer, a surface protection film is adhered to the front surface of the wafer.

When back-grinding is conducted on the wafer, the wafer is greatly reduced in thickness. Therefore, a dicing tape is adhered to the back surface of the wafer so that the wafer can be integrated with a mount frame into one body. When the wafer is integrated with the mount frame, the wafer can be easily handled in the next step.

Japanese Unexamined Patent Publication No. 2006-044152 discloses a adhering device in which a tape is drawn out onto a mount frame and a wafer so as to adhere the tape. The tape drawn out from a tape roller is guided by a guide member and adhered to a neighborhood of an edge portion of the mount frame at first by an adhering roller.

Figure 6:
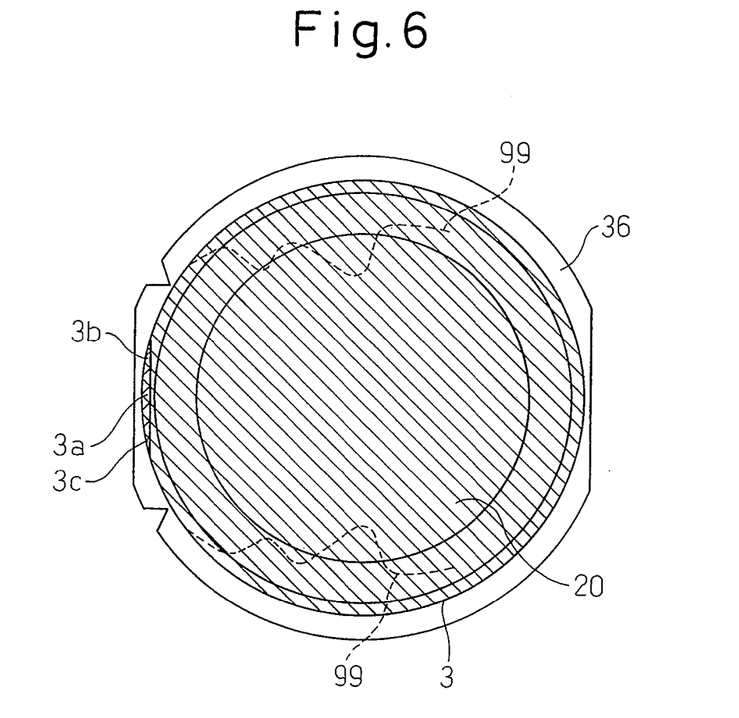
FIG. 6 is a top view showing a wafer at the time of starting adhering a tape to a mount frame in the prior art.

FIG. 6 is a top face view of a wafer in the case where adhering operation of a tape onto a mount frame is started in the prior art, such as disclosed in Japanese Unexamined Patent Publication No. 2006-044152. At the time of adhering as shown in FIG. 6, the tape 3 is adhered only to an adhering portion 3a located in the neighborhood of an edge portion of the mount frame 36.

Next, a table (not shown) for supporting the mount frame 36 and the wafer 20 is moved in the horizontal direction. Due to the foregoing, the tape 3 is adhered to the entire mount frame 36 and wafer 20.

However, at the beginning of adhering the tape 3 to the mount frame 36, the area of the adhering portion 3a is relatively small. Therefore, this is a case in which the tension of the tape 3 given by the tape roller exceeds the adhesive force at the adhering portion 3a. In this case, when the tension given to the tape 3 exceeds the elastic limit of the tape 3, wrinkles 99 extending in the longitudinal direction are formed on the tape outside both end portions 3b, 3c of the adhering portion 3a as shown in FIG. 6. Since these wrinkles 99 are formed on the tape 3 as a result of the tension that has exceeded the elastic limit of the tape 3, when the wrinkles 99 are formed, it is impossible to remove the wrinkles even after the tension given by the tape roller has been released.

Figure 7:
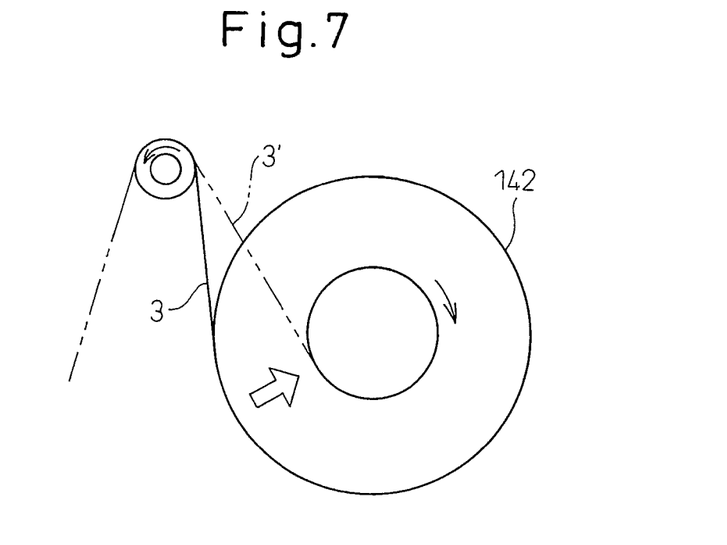
FIG. 7 is a view showing a common table roller.

In this connection, FIG. 7 is a view showing a state of a common tape roller. A draw-out position of the dicing tape 3, which is drawn out right after the tape roller 142 has been loaded into an adhering device, is located relatively outside in the radial direction. When the adhering operation of the dicing tape 3 progresses and the amount of the dicing tape 3 remaining on the tape roller 142 is reduced, the draw-out position of the dicing tape 3 is gradually moved inside in the radial direction. Concerning this matter, refer to the imaginary line 3' in FIG. 7. In the case where the draw-out position of the dicing tape 3 is located relatively outside, in order to prevent the tape roller 142 from over-running, it is necessary to arrange a braking mechanism (not shown) adjacent to the tape roller 142.

Due to the foregoing, right after the tape roller 142 has been loaded and right before the tape roller 142 is replaced, the intensity of the drive torque needed for rotating the tape roller 142 is different. The intensity of the drive torque right after the tape roller 142 has been loaded is considerably higher than the intensity of the drive torque right before the tape roller 142 is replaced. Therefore, the intensity of the tension given to the tape by the tape roller right after the tape roller 142 has been loaded is considerably high. As a result, right after the tape roller 142 has been loaded, wrinkles 99 described previously tend to form on the tape 3. Further, when the tension greatly exceeds the adhesive force at the adhering portion 3a, the tape 3, which has been adhered to the adhering portion 3a, may be detached from the mount frame 36.

The present invention has been accomplished in view of the above circumstances. It is an object of the present invention to provide a tape adhering method capable of preventing the formation of wrinkles. It is another object of the present invention to provide a tape adhering device in which this tape adhering method is executed.

SUMMARY OF THE INVENTION

In order to accomplish the above object, the first aspect provides a tape adhering device comprising: a tape roller for drawing out a tape; a braking means for braking one portion of a traveling tape drawn out from the tape roller; a tape drawing means for drawing out a predetermined amount of tape, which has been braked by the braking means, from the tape roller between the braking means and the tape roller; and a tape adhering means for adhering the tape, which is located downstream of the braking means, onto an object to be adhered if the braking of the tape by the braking means is loosened or released.

In the first aspect, the tape, for example, the dicing tape can be previously drawn out by a length corresponding to the object to be adhered. Therefore, when the tape is actually adhered, it is not necessary to rotate the table roller. That is, at the time of adhering the tape, no tension can be generated by the tape roller. Therefore, it is possible to prevent wrinkles from being formed on the tape. In this connection, the object to be adhered may be either the wafer or both the wafer and mount frame.

According to the second aspect, as in the first aspect, the tape adhering means includes an adhering roller for pressing and adhering the tape to an edge portion of the object to be adhered, and also includes a support table capable of moving in the horizontal direction, for supporting the object to be adhered.

That is, in the second embodiment, after the tape has adhered to an edge portion of the object to be adhered, the support table is moved in the horizontal direction. In this way, the tape can be adhered to the entire object.

According to the third aspect, as in the second aspect, the support table is raised when the tape is adhered to the object.

That is, according to the third aspect, an amount of movement of the adhering roller for pressing the tape to the object to be adhered is made to be relatively small. Due to the foregoing, the tape can be prevented from being oscillated at the time of adhering.

According to the fourth aspect, as in one of the first to the third aspect, the tape drawing means is a dancer roller.

That is, according to the fourth aspect, a predetermined amount of the tape can be further drawn out by a relatively simple structure.

According to the fifth aspect, as in one of the first to fourth aspect, the length of the tape drawn out by the tape drawing means between the braking means and the tape adhering means is not less than a diameter of the object to be adhered.

That is, according to the fifth aspect, it is possible to ensure the amount of tape necessary for being adhered to the entire object to be adhered.

According to the sixth aspect, as in one of the first to the fifth aspects, a tape sticking device further comprises a drive roller for rotating the tape roller in order to draw out the tape, wherein the drive roller stops the tape roller at the time of adhering the tape.

That is, in the sixth aspect, when the drive roller is stopped, it is possible to positively prevent tension from being generated by the drawing roller.

According to the seventh aspect, as in the second aspect, the tape has a shape substantially corresponding to a front surface of the object to be adhered and a plurality of the tape is adhered at predetermined intervals in the longitudinal direction of a base tape, the tape adhering device further comprising a detection means for detecting a trailing end of the tape, wherein the detection means is positioned in such a manner that the tape can be arranged being adjacent to the adhering roller when the trailing end of the tape is detected by the detection means.

That is, in the seventh aspect, the leading end portion of the tape can be accurately arranged at a position adjacent to the adhering roller. The detection means is, for example, a thickness sensor. Alternatively, a camera may be employed as the detection means, and an image obtained by the camera may be processed by a computer so as to detect the trailing end of the tape.

The eighth aspect provides a tape adhering method comprising the steps of: drawing out tape from a tape roller; braking one portion of the tape, which has been drawn out from the tape roller, by a braking means of braking the traveling tape; further drawing out the tape, which has been braked by the braking means, from the tape roller by a predetermined amount between the braking means and the tape roller; loosening or releasing the braking action conducted on the tape by the braking means; and adhering the tape, which is located downstream of the braking means, to an object to be adhered.

In the eighth aspect, the tape, for example, the dicing tape can be previously drawn out by a length corresponding to the object to be adhered. Therefore, when the tape is actually adhered, it is not necessary to rotate the table roller. That is, at the time of adhering the tape, no tension is generated by the tape roller. Therefore, it is possible to prevent wrinkles from being formed on the tape. In this connection, the object to be adhered may be either a wafer or both a wafer and mount frame.

According to the ninth aspect, as in the eighth aspect, the object to be adhered is supported by a support table, when the tape is adhered to the object to be adhered, the tape is adhered to an edge portion of the object to be adhered by pressing the tape and then the support table is moved in the horizontal direction.

That is, in the ninth aspect, after the tape has adhered to an edge portion of the object to be adhered, the support table is moved in the horizontal direction. In this way, the tape can be adhered to the entire object to be adhered.

According to the tenth aspect, as in the eight or the ninth aspect, the support table is raised when the tape is adhered to the edge portion of the object to be adhered.

That is, according to the tenth aspect, the amount of movement of the adhering roller for pressing the tape to the object to be adhered is made to be relatively small. Due to the foregoing, the tape can be prevented from being oscillated at the time of adhering.

These and other objects, features and advantages of the present invention will be more apparent in light of the detailed description of exemplary embodiments thereof as illustrated by the drawings.

DETAILED DESCRIPTION OF THE PREFERRED EMBODIMENTS

Referring to the accompanying drawings, an embodiment of the present invention will be explained below. Like reference numerals are used to indicate like parts in the following drawings. In order to facilitate the understanding, the reduced scale used in these drawings is appropriately changed.

Figure 1:
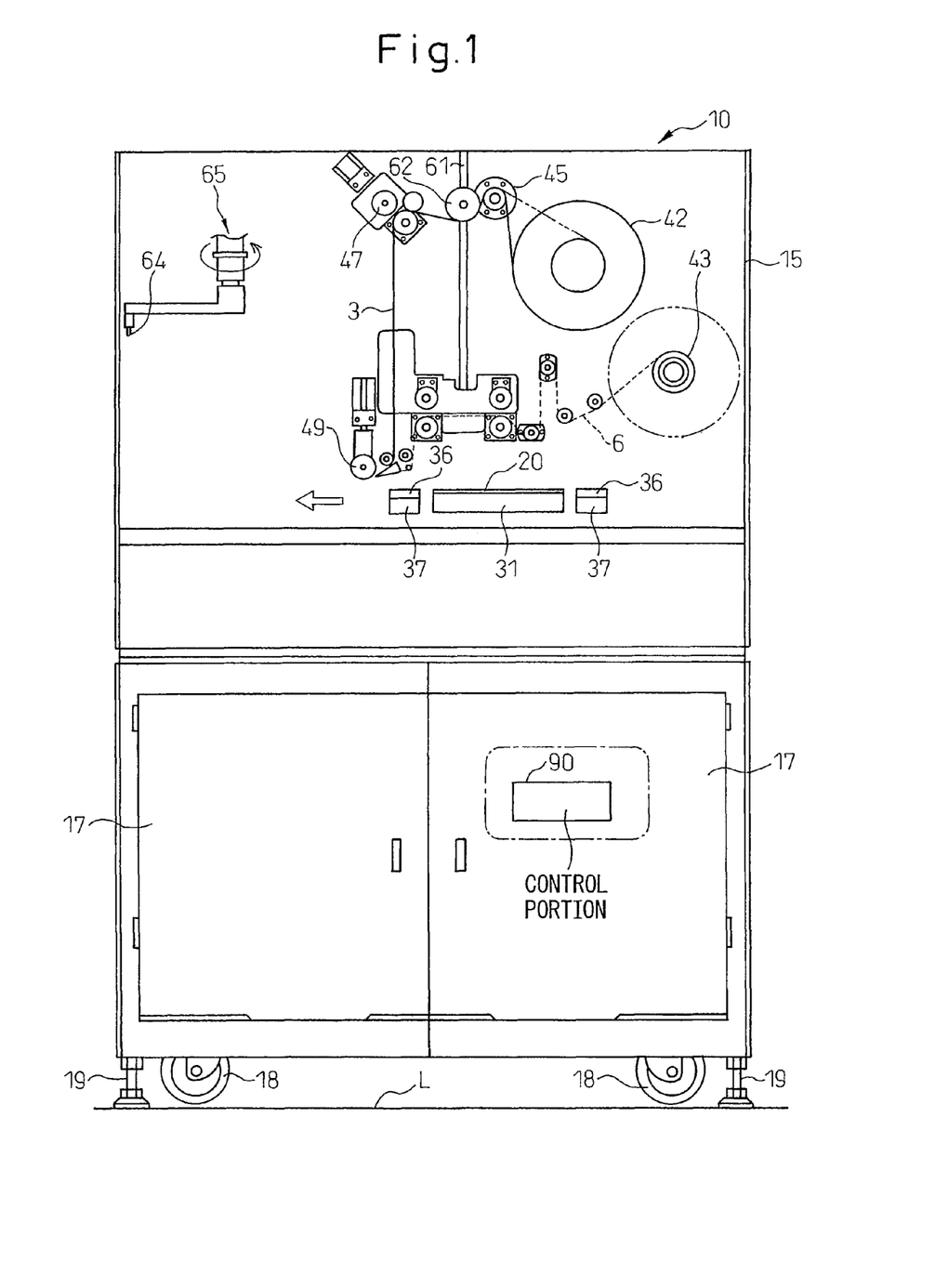
FIG. 1 is a sectional schematic view showing a tape adhering device according to the present invention.

FIG. 1 is a schematic illustration showing a tape adhering device according to the present invention. The back surface of a wafer 20, which is supplied to the tape adhering device 10, is ground by the method of back-grinding. For example, the wafer 20 is not more than 100 micrometers thick. As it is well known, a surface protection film 11 (not shown) for protecting a semiconductor element has already been adhered to the front surface of the wafer 20.

The wafer 20 is supported by a movable table 31 of the tape adhering device 10 under the condition that a back surface 22 of the wafer 20 is directed upward. As shown in the drawing, a ring-shaped mount frame 36, which is a little larger than the wafer 20, is supported by a ring-shaped movable table 37 arranged concentrically with the movable table 31. These movable tables 31, 37 are integrally moved in the horizontal and perpendicular directions by a well-known means.

The tape adhering device 10 shown in FIG. 1 includes: a tape roller 42 for drawing out a dicing tape 3 to be adhered to a circular silicon wafer 20 and a mount frame 36; and a winding roller 43 for winding a release of the tape drawn out from the tape roller 42, wherein the tape roller 42 and the winding roller 43 are arranged in a housing 15. As shown in the drawing, a plurality of casters 18 and stoppers 19 are arranged on a bottom face of the housing 15. The tape adhering device 10 can be moved to a predetermined position on the floor L using casters 18. Further, the tape adhering device 10 can be fixed at this position by the stoppers 19.

In a lower portion of the tape adhering device 10, doors 17 are arranged. When these doors 17 are opened, it is possible for an operator to have access to a control portion 90, which is arranged in the lower portion of the tape adhering device 10, for example, a digital computer. Each component of the tape adhering device, 10 described later, is connected to the control device 90. Therefore, the control portion 90 controls the operation of each component of the tape adhering device 10.

As shown on the left of FIG. 1, the tape adhering device 10 includes a cutter unit 65. The cutter unit 65 can be reciprocated in the vertical direction. This cutter unit 65 has a cutter 64 capable of being rotated. After the dicing tape has been adhered, the cutter unit 65 is moved to the wafer 20, and then the cutter 64 is rotated along a circumferential edge of the mount frame 36. Due to the foregoing, the dicing tape 3, which has been adhered to the wafer 20 and the mount frame 36, can be cut off.

Figure 2:
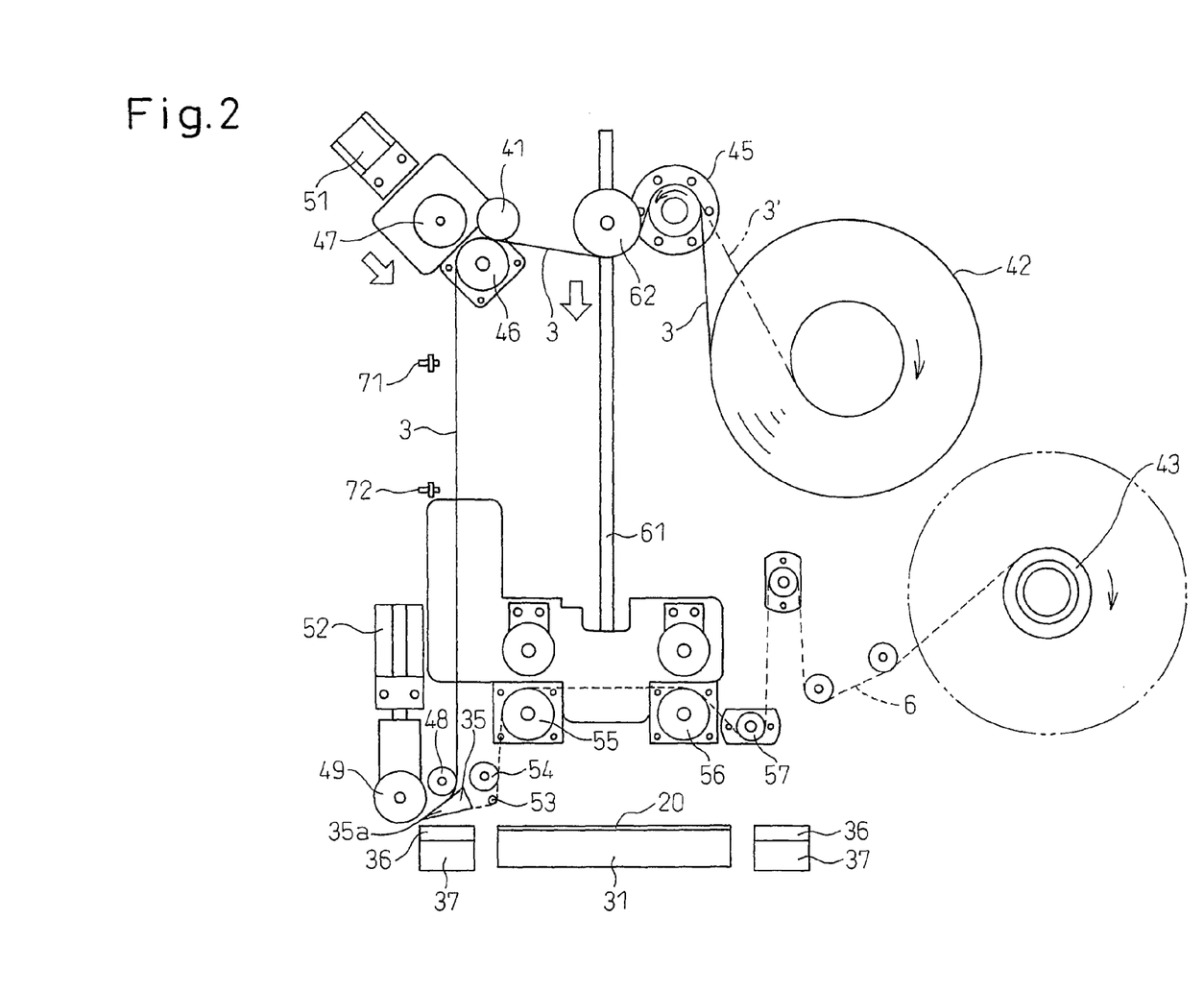
FIG. 2 is a first partial enlarged view in which a portion of the tape adhering device is shown being enlarged.

FIG. 2 is a first partial enlarged view, in which a portion of the tape adhering device is shown enlarged. As shown in FIG. 2, in the downstream of the tape roller 42, a drive roller 45, which is driven by a motor not shown, is provided. The drive roller 45 rotates the tape roller 42 so that the dicing tape 3 can be drawn out from the tape roller 42.

In the downstream of the drive roller 45, a pair of braking rollers 46, 47 are provided. A measuring roller 41 is arranged adjacent to one of the braking roller 46 usually engaged with the dicing tape 3. The measuring roller 41 detects a length of the dicing tape 3 that has traveled. The other braking roller 47 is pressed to one braking roller 46 by a first air cylinder 51. Due to the foregoing, the dicing tape 3, which is engaged with one braking roller 46, is held between the braking rollers 46, 47. Accordingly, the dicing tape 3 can be temporarily fixed at that position. In the case where the pressing force of the braking roller 47 to the braking roller 46 is reduced, it is possible to brake the dicing tape 3, that is, a braking force can be given to the dicing tape 3.

Downstream of the braking roller 47, a guide roller 48 and a guide member 35, the tip portion 35a of which is shaped into a knife-edge, are provided. After the dicing tape 3 has been folded back at the tip portion 35a of the guide member 35, the dicing tape 3 extends toward the winding roller 43.

On an adhesive face of the dicing tape 3, a release 6 (base tape) is adhered in advance. Between the tape roller 42 and the guide member 35, the dicing tape 3 is drawn out integrally with the release 6. When the dicing tape 3 is folded back at the tip portion of the guide member 35, it is peeled from the release 6 and adhered to the mount frame and others as described later. As shown in the drawing, the release 6, which has been peeled from the dicing tape 3, is guided to the winding roller 43 through a plurality of guide rollers 53, 54, 57. At this time, drive rollers 55, 56 arranged between the guide rollers 54 and 57 are driven. Therefore, the release 6 is moved to the winding roller 43. In this connection, the drive rollers 55, 56 are connected to motors not shown in the drawing.

In FIG. 2, the adhering roller 49 is arranged adjacent to the tip portion 35a of the guide member 35. The adhering roller 49 is elevated and lowered by the second air cylinder 52. The adhering roller 49 presses the dicing tape 3, which has been peeled from the release 6, onto a front surface of the mount frame 36 or the wafer 20.

The tape adhering device 10 of the present invention further includes a dancer roller 62 provided between the drive roller 45 and the braking roller 46. The dancer roller 62 slides on a rail 61 arranged in the substantially vertical direction. As shown in the drawing, the dicing tape 3 extends between the drive roller 45 and the braking roller 46 in the substantially horizontal direction. Accordingly, when the dancer roller 62 slides on the rail 61, the dicing tape 3 is engaged with the dancer roller 62 and further drawn out.

Instead of the dicing tape 3 being continuously adhered to the entire release 6, a plurality of dicing tapes 3, the shapes of which substantially correspond to an outline of the mount frame 36, may be adhered in the longitudinal direction of the release 6 at predetermined intervals. When this structure is employed, the cutter unit 65, which is used after the dicing tape has been adhered, is excluded.

In the case where the dicing tape 3, the shape of which substantially corresponds to the outline of the mount frame 36, is employed, a plurality of sensors, for example, two sensors 71, 72, which are arranged between the braking roller 46 and the guide roller 48, are used. These sensors 71, 72 are thickness sensors for detecting the total thickness of the dicing tape 3 and the release 6. Alternatively, these sensors 71, 72 are sensors for detecting a change in the color of the dicing tape 3.

These sensors 71, 72 are used for adhering the dicing tape 3 to the wafer 20 and/or the mount frame 36 of a different size. For example, one sensor 71 is used when the dicing tape 3 is adhered to the wafer 20, the diameter of which is, for example about 300 mm (12 inches). The other sensor 72 is used when the dicing tape 3 is adhered to the wafer 20, the diameter of which is, for example about 200 mm (8 inches).

When the sensors 71, 72 detect a change in the total thickness of the dicing tape 3 between the braking roller 46 and the guide roller 48 and/or a change in the color of the dicing tape 3, a position of the trailing end on the upstream side of the dicing tape 3, the shape of which substantially corresponds to the outline of the mount frame 36, is detected. These sensors 71, 72 are previously positioned in such a manner that a leading end on the downstream side of the dicing tape 3 is arranged right below the sticking roller 49 when the trailing end of the dicing tape 3 is detected by the sensors 71, 72. In other words, the distance between the sensor and the adhering roller 49 along the dicing tape 3 corresponds to the length of the dicing tape 3 to be adhered.

In this connection, in another embodiment not shown in the drawing, a camera connected to the control portion 90 may be used as sensors 71, 72. In this case, when an image obtained by the camera is processed by a computer, it is possible to discriminate between a portion where the dicing tape 3 exists and a portion where only the release 6 exists. According to this discrimination, it is possible to detect a position of the trailing end or the leading end of the dicing tape 3.

Figure 3:
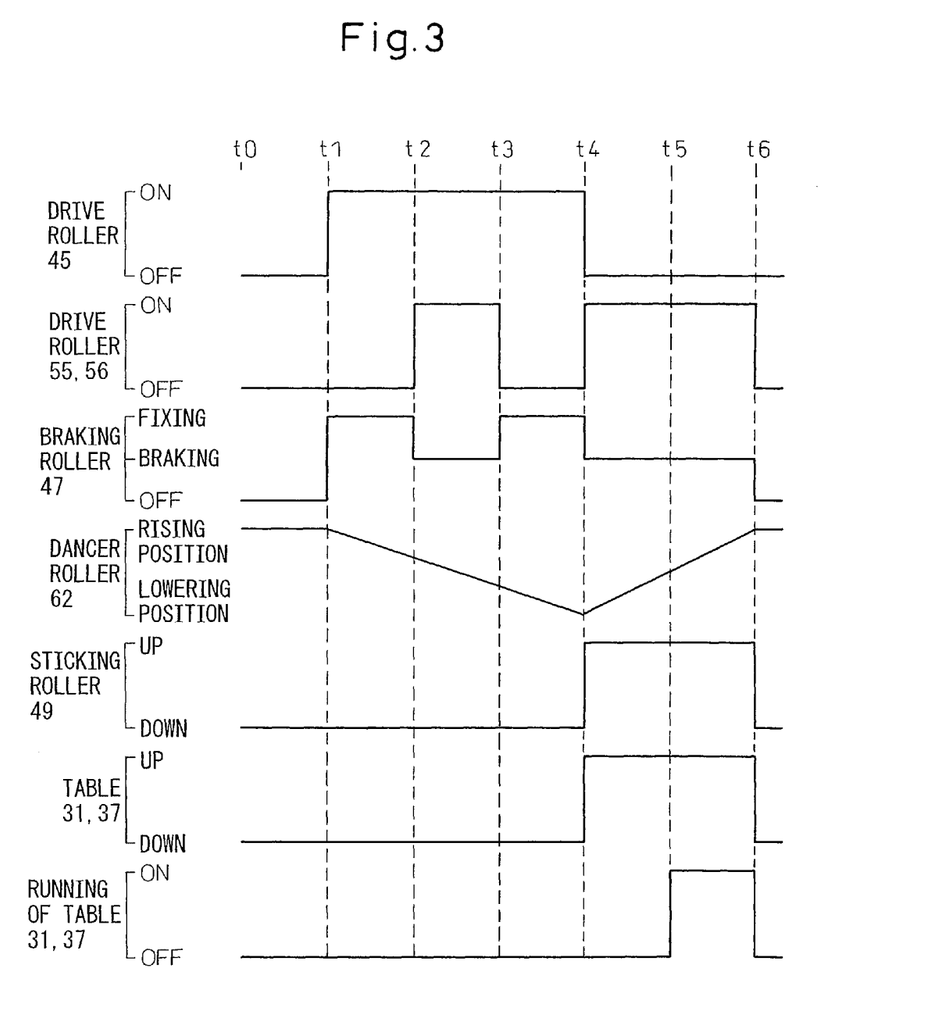
FIG. 3 is a time chart of the tape adhering device of the present invention.
Figure 4:
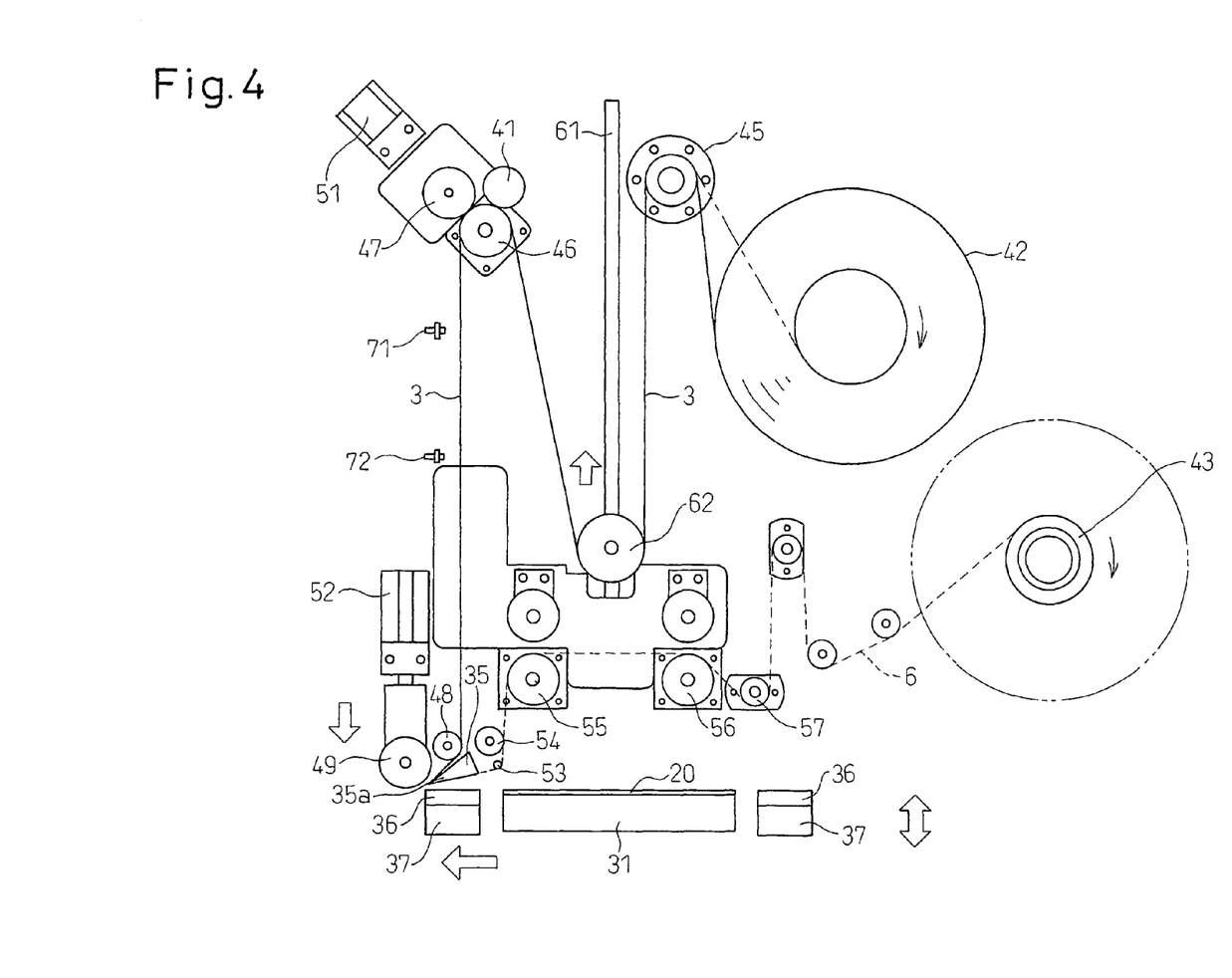
FIG. 4 is a second partial enlarged view in which a portion of the tape adhering device is shown being enlarged.

FIG. 3 is a time chart of the tape adhering device of the present invention. FIG. 4 is a second partial enlarged view in which a portion of the tape adhering device is shown enlarged. Referring to FIGS. 2 to 4, operation of the tape adhering device 10 of the present invention will be explained below. In this connection, before the tape adhering device 10 is driven, any of the drive roller 45, the braking roller 47 and the adhering roller 49 are not operated and the dancer roller 62 is located at an upper position thereof.

At first, at time t1 in FIG. 3, the drive roller 45 is set in motion so that the dicing tape 3 is drawn out from the tape roller 42. In the case where a plurality of dicing tapes 3, the shapes of which correspond to the shape of the mount frame 36, are adhered to the release 6, the trailing end of the dicing tape 3 is detected by the sensor 71 (or sensor 72). In FIG. 3, the trailing end of the dicing tape 3 is detected at time t4. At time t1, the first air cylinder 51 is driven so as to drive the braking roller 47.

Due to the foregoing, as shown in FIG. 4, the dicing tape 3 is held between the braking rollers 46, 47 and temporarily fixed. That is, at this time, the braking roller 47 brakes the dicing tape 3 at a fixing position where the dicing tape 3 is fixed. Simultaneously when the dicing tape 3 is fixed, the dancer roller 62 is moved downward along the rail 61. Due to the foregoing, the dancer roller 62 is engaged with the dicing tape 3 and pulls the dicing tape 3 along the rail 61. Since the drive roller 45 is continuously driven even while the dancer roller 62 is being moved, the dicing tape 3 is continuously drawn out from the tape roller 42.

As can be seen from FIG. 3, in the period of time from time t2 to time t3, the first air cylinder 51 is driven so that the braking force can be reduced and the braking roller 47 is put into a braking state. When the braking roller 47 is in the braking state, although a predetermined braking force is applied to the dicing tape 3, the dicing tape 3 can be slightly sent out.

Figure 5A:
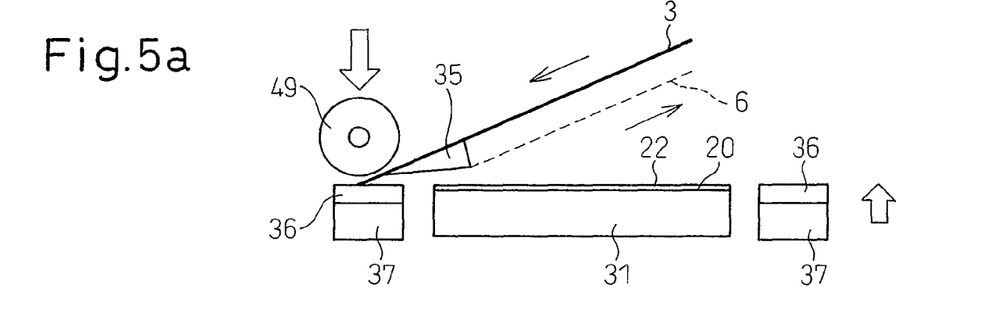
FIG. 5a is a first enlarged view in which a neighborhood of a movable table is shown being enlarged.

As shown in the drawing, in the period of time from time t2 to time t3 when the braking roller 47 is in a braking state, the drive rollers 55, 56 are moved so that the release 6 can be slightly drawn out. As shown in FIG. 5a in which a neighborhood of the movable table is shown being enlarged, the tip portion of the dicing tape 3 is positioned right below the adhering roller 49 by this drawing operation. After this fine adjustment has been conducted, the braking roller 47 is put into a fixing state in which the dicing tape 3 is fixed, and the drive rollers 55, 56 are stopped. Concerning this matter, refer to FIG. 3.

When the dancer roller 62 arrives at a predetermined lowering position as shown in FIG. 4, the drive roller 45 is stopped at time t4, so that the dicing tape 3 cannot be drawn out anymore from the tape roller 42. Accordingly, in the successive adhering step, tension, which is generated by pulling the dicing tape 3 from the tape roller 42, is not given to the dicing tape 3.

In this connection, the length of the dicing tape 3, which has been drawn out by lowering the dancer roller 62, is substantially the same as the length of the dicing tape 3 to be adhered to the mount frame 36 and the wafer 20. In other words, the lowering distance of the dancer roller 62 is determined by the length of the dicing tape 3 to be adhered to the mount frame 36 and the wafer 20 to be used. Accordingly, the lowering distance of the dancer roller 62 in the case of using the wafer 20, the diameter of which is about 300 mm (12 inches), is different from the lowering distance of the dancer roller 62 in the case of using the wafer 20, the diameter of which is about 200 mm (8 inches).

Next, at time t4, the first air cylinder 51 is driven so as to put the other braking roller 47 into a braking state. In the case where these rollers 46, 47 are completely separated from each other, no tension is applied to the dicing tape 3 and wrinkles form. Therefore, the braking roller 47 is put into a braking state in which tension applied to the dicing tape is maintained at a predetermined level while the fixed dicing tape 3 is being released. As can be seen from FIG. 3, simultaneously when the dicing tape 3 is braked, the second air cylinder 52 is driven so as to lower the adhering roller 49.

Figure 5B:
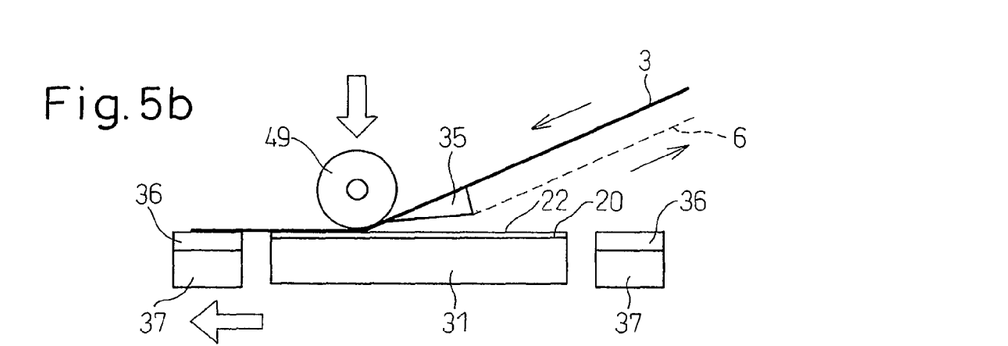
FIG. 5b is a second enlarged view in which the neighborhood of the movable table is shown being enlarged.

FIGS. 5a and 5b are a first and a second enlarged view in which the neighborhood of the movable table is shown being enlarged. As shown in FIG. 5a, when the adhering roller 49 is lowered, the adhering roller 49 presses the dicing tape 3 onto a front surface of the mount frame 36. Due to the foregoing, the dicing tape 3 is adhered to a portion of the mount frame 36 located slightly inside with respect to the outer circumference of the mount frame 36.

In this connection, when the dicing tape 3 is adhered to the edge portion of the mount frame 36, in addition to the lowering of the adhering roller 49, the movable tables 31, 37 may be slightly raised in the vertical direction as shown in FIG. 3. In this case, the amount of lowering of the adhering roller 49 is reduced. Therefore, the dicing tape 3 can be prevented from being oscillated between the sticking roller 49 and the mount frame 36. As a result, the dicing tape 3 can be more stably adhered.

Next, as shown in FIGS. 3 and 5b; at time t5 after the dicing tape has adhered, the movable tables 31, 37 are horizontally moved to the left. Due to the foregoing, in synchronization with the horizontal movements of the movable tables 31, 37, the dancer roller 62 is raised along the rail 61. Concerning this matter, refer to FIGS. 3 and 4.

When the end portions on the opposite side of the movable tables 31, 37 pass through the adhering roller 49, the dicing tape 3 is adhered to the entire face of the mount frame 36 and wafer 20. As a result, the wafer 20 can be integrated with the mount frame 36 into one body. Therefore, the wafer 20 and mount frame 36 can be easily handled in the next-step.

As can be seen from FIG. 3, when the adhering of the dicing tape 3 has been completed, the second air cylinder 52 is driven and the adhering roller 49 is raised to the original position. However, in the case where the dicing tape 3 is adhered by raising the movable table 31 as shown in FIGS. 4 and 5a, the movable table 31 is lowered so as to make a gap between the adhering roller 49 and the movable table 31. In this connection, the dicing tape 3 may be adhered by using both the adhering roller 49 and movable table 31. When the sticking of the dicing tape 3 has been completed, the dancer roller 62 is stopped at the original position before the tape adhering device 10 is operated.

In the case where the dicing tape 3 is continuously adhered to the entire release 6, after the dicing tape 3 has adhered, the cutter unit 65 shown in FIG. 1 is driven. That is, the cutter 64 of the cuter unit 65 is rotated along an outer circumference of the mount frame 36 so that the dicing tape 3 can be cut off. After that, the movable tables 31, 37 are returned to their original positions and the above adhering operation is repeated.

As described above, according to the present invention, a necessary length of the dicing tape 3 is previously drawn out with the dancer roller 62. The dicing tape 3, which has been previously drawn out in this way, is adhered to the mount frame 36 and the wafer 20. Therefore, at the time of adhering the dicing tape 3, it is not necessary to rotate the tape roller 42 by the drive roller 45.

Further, according to the present invention, at the time of adhering the dicing tape 3, only the dicing tape 3, which has been drawn out by the dancer roller 62, is consumed. Therefore, it is possible to conduct an adhering operation without drawing out new tape from the tape roller 42. Accordingly, the drive roller 46 for driving the tape roller 42 may be stopped at the time of adhering the dicing tape 3. Therefore, in the present invention, it is possible to prevent wrinkles from being formed on the dicing tape 3 located upstream of the portion where the dicing tape 3 is adhered to the mount 36 or the wafer 20.

Further, in the present invention, as described before, at the time of adhering the dicing tape 3, the drive roller 45 is stopped. Therefore, little tension is generated by the tape roller 42 at the time of adhering the dicing tape 3. Accordingly, tension generated right after the tape roller 42 is loaded is substantially the same as the tension generated right before the tape roller 42 is replaced. Therefore, in the present invention, irrespective of a residual amount of tape of the tape roller, the dicing tape 3 can be stably adhered by uniform force (tension).

The above explanations are made in which the dicing tape 3 is adhered to the back surface of the wafer 20 so that the wafer 20 and the mount frame 36 can be integrated with each other. However, the following will be clearly understood. In the case where another tape is adhered to the wafer 20, for example, in the case where a surface protection film is adhered to the front surface of the wafer 20, the tape adhering device 10 of the present invention can be applied.

Although the invention has been shown and described with exemplary embodiments thereof, it should be understood by those skilled in the art that the foregoing and various other changes, omissions and additions may be therein and thereto without departing from the scope of the invention.

The invention claimed is:

1. A tape adhering method comprising the steps of:
    drawing out a tape from a tape roller;
    fixing one portion of the tape, which has been drawn out from the tape roller, by a braking means;
    further drawing out the tape, which has been fixed by the braking means, from the tape roller between the braking means and the tape roller;
    reducing a braking force of the braking means so that the tape is sent out;
    drawing out a release of the tape from a tip portion of the tape when the braking force is reduced to position the tape below an adhering roller to adhere the tape onto an edge of an object to be adhered;
    fixing the tape by the braking means;
    stopping the drawing out of the release of the tape;
    stopping the drawing out of the tape from the tape roller, when the tape has been drawn out by a predetermined amount; and
    adhering the tape, which is located downstream of the braking means, onto the object to be adhered.

2. A tape adhering method according to claim 1, wherein the object to be adhered is supported by a support table,
    when the tape is adhered to the object to be adhered, the tape is adhered to an edge portion of the object to be adhered by pressing the tape and then the support table is moved in the horizontal direction.

3. A tape adhering method according to claim 2, wherein the support table is raised when the tape is adhered to the edge portion of the object to be adhered.

* * * * *